(12) United States Patent
Lee et al.

(10) Patent No.: US 8,775,318 B2
(45) Date of Patent: Jul. 8, 2014

(54) METHOD AND SYSTEM FOR UPDATING FIRMWARE OF TERMINALS IN A BROADCAST SYSTEM

(75) Inventors: Jong-Hyo Lee, Pyeongtaek-si (KR); Ji-Eun Keum, Suwon-si (KR); Sung-Oh Hwang, Yongin-si (KR); Bo-Sun Jung, Seongnam-si (KR); Kook-Heui Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1104 days.

(21) Appl. No.: 12/414,231

(22) Filed: Mar. 30, 2009

(65) Prior Publication Data

US 2009/0265700 A1    Oct. 22, 2009

(30) Foreign Application Priority Data

Mar. 28, 2008    (KR) .................. 10-2008-0029378

(51) Int. Cl.
    *G06F 21/00* (2013.01)
(52) U.S. Cl.
    USPC ............. 705/56; 717/168; 717/172; 717/174; 712/37
(58) Field of Classification Search
    USPC .......... 705/51, 56; 717/168, 172, 174; 172/37
    See application file for complete search history.

(56) References Cited

U.S. PATENT DOCUMENTS

| | | | |
|---|---|---|---|
| 7,668,612 B1 * | 2/2010 | Okkonen ........................ | 700/95 |
| 7,904,895 B1 * | 3/2011 | Cassapakis et al. .......... | 717/168 |
| 8,244,845 B2 * | 8/2012 | Rao .............................. | 709/223 |
| 2005/0055684 A1 * | 3/2005 | Rao et al. ....................... | 717/168 |
| 2005/0223373 A1 * | 10/2005 | Gage et al. ..................... | 717/168 |
| 2006/0010437 A1 * | 1/2006 | Marolia ......................... | 717/168 |
| 2006/0217111 A1 * | 9/2006 | Marolia et al. ................. | 455/418 |
| 2007/0093243 A1 * | 4/2007 | Kapadekar et al. ........... | 455/419 |
| 2007/0124359 A1 | 5/2007 | Hwang et al. | |
| 2007/0169073 A1 * | 7/2007 | O'Neill et al. ................. | 717/168 |
| 2007/0207800 A1 * | 9/2007 | Daley et al. .................... | 455/425 |
| 2007/0294686 A1 * | 12/2007 | Oh ................................. | 717/168 |
| 2008/0126222 A1 | 5/2008 | Li et al. | |
| 2011/0283303 A1 | 11/2011 | Jung et al. | |

FOREIGN PATENT DOCUMENTS

| | | |
|---|---|---|
| CN | 1863396 | 11/2006 |
| CN | 1933440 | 3/2007 |
| CN | 1956585 | 5/2007 |
| JP | 2005-251028 | 9/2005 |

(Continued)

OTHER PUBLICATIONS

Merriam Webster's Collegiate Dictionary 10th Ed., Merriam Webster, Inc., 1993, p. 1346.*

(Continued)

*Primary Examiner* — Calvin Cheung
(74) *Attorney, Agent, or Firm* — The Farrell Law Firm, P.C.

(57) ABSTRACT

A method and apparatus for updating firmware of terminals in a mobile broadcast system including a Broadcast Service Distribution/Adaptation fragment (BSDA) and a Broadcast service Subscription Management (BSM). The method includes requesting creation of a content fragment, by the BSM, by transmitting a firmware package file for a firmware update of the terminals to the BSDA; creating a content fragment including the firmware package file and broadcasting the created content fragment to the terminals by the BSDA; detecting the firmware package file from the received content fragment; and performing the firmware update using the firmware package file.

16 Claims, 4 Drawing Sheets

(56) References Cited

FOREIGN PATENT DOCUMENTS

| | | |
|---|---|---|
| KR | 1020070034368 | 3/2007 |
| KR | 1020070079631 | 8/2007 |
| WO | WO 2004/042972 | 5/2004 |
| WO | WO 2006/014076 | 2/2006 |
| WO | WO 2007/042907 | 4/2007 |
| WO | WO 2007/064167 | 6/2007 |

OTHER PUBLICATIONS

Open Mobile Alliance, Mobile Broadcast Services Architecture, OMA-AD-BCAST-V1_0-20080226-C, Candidate Version 1.0, Feb. 26, 2008.

Open Mobile Alliance, Mobile Broadcast Services Architecture, OMA-AD-BCAST-V1_0-20070529-C, Candidate Version 1.0, May 29, 2007.

\* cited by examiner

METHOD AND SYSTEM FOR UPDATING FIRMWARE OF TERMINALS IN A BROADCAST SYSTEM

PRIORITY

This application claims priority under 35 U.S.C. §119(a) to an application filed in the Korean Industrial Property Office on Mar. 28, 2008 and assigned Serial No. 10-2008-0029378, the contents of which are hereby incorporated by reference.

BACKGROUND OF THE INVENTION

1. Field of the Invention

The present invention relates generally to a mobile broadcast system supporting a broadcast service, and more particularly to a method and an apparatus for updating firmware of terminals through a service guide of a mobile broadcast system.

2. Description of the Related Art

The mobile communication market has continuously met requirements for the production of new services through the recombination or unification of existing technologies. With the development of communication and broadcast technologies, current broadcast systems or mobile communication systems provide a broadcast service through a portable terminal (or mobile terminal; hereinafter, referred to simply as "terminal"), such as a mobile phone or a Personal Digital Assistant (PDA).

In addition to potential and actual market demands, rapidly increasing user demands for multimedia services, enterprisers' strategy to provide a new service such as a broadcast service beyond the existing voice service, and interests of Information Technology (IT) companies that are enhancing mobile communication businesses in response to consumer demands have enabled the convergence between a mobile communication service and the Internet Protocol (IP) to become a big stream in the development of next generation mobile communication technology. This convergence has introduced that application of various services existing in wireless communication or broadcast even into the wire communication market as well as the mobile communication market. Such a convergence has created the same consumption environment for various services regardless of them being wired, wireless, or broadcast.

The Open Mobile Alliance (OMA), which is an organization studying standards for interaction between individual mobile solutions, determines the standards for various applications mainly relating to mobile games, Internet services, etc. Within the working groups of the OMA, especially in the Open Mobile Alliance Broadcast (OMA BCAST) working group, technology standards are being studied for providing a broadcast service (BCAST) using a mobile terminal.

In order to receive a broadcast service in a broadcast system, a terminal should receive service guide information including description of the service itself, cost information for the service, and information on a method of receiving the service. That is, the terminal receives the service using the received service guide information of the service.

FIG. 1 is a block diagram illustrating a mobile broadcast system to which the present invention is applied. More specifically, FIG. 1 illustrates a logical structure between working groups in a BCAST system having established technology standards of an application layer of a mobile broadcast service and sub-layers thereof up to the transport layer in order to provide a mobile broadcast service.

Referring to FIG. 1, a content provider or Content Creation (CC) 101 provides content, which is the basis for the BCAST service. The content may include a file for a typical BCAST, such as data for movie, audio, and video. Further, the CC 101 provides a BCAST Service Application (BSA) 102 with an attribute of the content in order to generate a service guide and determine a transport bearer for the transmission of the service.

The BSA 102 receives data of the BCAST service from the CC 101, and converts the data into a type suitable for media encoding, content protection, interactive service provision, etc. Further, the BSA 102 provides the attribute of the content supplied from the CC 101 to a BCAST Service Distribution/Adaptation (BSDA) 103 and a BCAST Subscription Management (BSM) 104.

The BSDA 103 performs various tasks using the BCAST service data supplied from the BSA 102. These various tasks include file and streaming transmission, service collection, service protection, service guide creation and delivery, and service notification. Further, the BSDA fragment 103 adjusts the service to be suitable for a Broadcast Distribution System (BDS) 112.

The BSM 104 manages, by hardware or software, service regulation including subscription and charge-related functions of a BCAST service user, regulation of information used for the BCAST service, and a terminal receiving the BCAST service.

The terminal 105 receives content and program support information such as service guide and content protection, and provides a user with a broadcast service. The BDS Service Distribution 111 transmits a mobile broadcast service to multiple terminals through inter-communication with the BDS 112 and an interaction network 113.

The BDS 112 transmits a mobile broadcast service through a broadcast channel, such as Multimedia Broadcast Multicast Service (MBMS) of the 3rd Generation Project Partnership (3GPP), Broadcast Multicast Service (BCMCS) of 3rd Generation Project Partnership 2 (3GPP2), which is the $3^{rd}$ generation synchronous mobile communication standard organization, and Digital Video Broadcasting (DVB)-Handheld (DVB-H) or Internet Protocol (IP)-based broadcast/communication network of DVB, which is a digital broadcast standard organization. The interaction network 113 provides an interactive channel, an example of which is as a cellular network.

In FIG. 1, BCAST-1 121 is a transmission path for content and a content attribute, and BCAST-2 122 is a transmission path for a content-protected or content-unprotected BCAST service, an attribute of the BCAST service, and a content attribute. BCAST-3 123 is a transmission path for an attribute of a BCAST service, an attribute of content, user preference and subscription information, a user request, and a response to the user request. BCAST-4 124 is a transmission path for a notification Message, an attribute used for a service guide, and a key used for content Protection and service protection.

BCAST-5 125 is a transmission path for security materials, such as a Digital Right Management Right Object (DRM RO) and a key value, which are used for a protected BCAST service, an unprotected BCAST service, a content-protected BCAST service, a content-unprotected BCAST service, a BCAST service attribute, a content attribute, a notification, a service guide, and BCAST service protection, and all data and signals transmitted through the broadcast channel.

In FIG. 1, BCAST-6 126 is a transmission path for security materials, such as a DRM RO and a key value, which are used for a protected BCAST service, an unprotected BCAST service, a content-protected BCAST service, a content-unprotected BCAST service, a BCAST service attribute, a content attribute, a notification, a service guide, and BCAST service protection, and all data and signals transmitted through an interaction channel.

BCAST-7 127 is a transmission path for user preference information transmitted through an interaction channel of control information relating to reception of security materials, such as a DRM RO and a key value, used for service provisioning, subscription information, device management, and BCAST service protection. The BCAST-8 128 is a transmission path in which user data for the BCAST service comes into interaction.

BDS-1 129 is a transmission path for security materials, such as a DRM RO and a key value, used for a protected BCAST service, an unprotected BCAST service, a BCAST service attribute, a content attribute, a notification, a service guide, and BCAST service protection. BDS-2 130 is a transmission path for security materials, such as a DRM RO and a key value, used for service provisioning, subscription information, device management, and BCAST service protection.

X-1 131 is a reference point between the BDS service distribution 111 and the BDS 112. X-2 132 is a reference point between the BDS service distribution 111 and the interaction network 113. X-3 133 is a reference point between the BDS 112 and the terminal 105. X-4 134 is a reference point between the BDS service distribution 111 and the terminal 105 through a broadcast channel. X-5 135 is a reference point between the BDS service distribution 111 and the terminal 105 through an interaction channel. X-6 136 is a reference point between the interaction network 113 and the terminal 105.

FIG. 2 illustrates a configuration of a service guide for receiving a broadcast service to which the present invention is applied. More specifically, the configuration illustrated in FIG. 2 is proposed for providing a broadcast service to terminals by a BCAST system.

Referring to FIG. 2, the service guide data model includes an administrative group 200, a provisioning group 210, a core group 220, and an access group 230. The administrative group 200 provides basic information for enabling a terminal to receive a service guide. That is, the administrative group 200 provides higher configuration information of the entire service guide. The administrative group 200 includes a service guide delivery descriptor fragment 201.

The provisioning group 210 includes purchase and cost information. The provisioning group 210 includes a purchase item fragment 211, a purchase data fragment 212, and a purchase channel fragment 213.

The core group 220 is a core part of the service guide, such as service, content, and schedule. The core group 220 includes a service fragment 221, a schedule fragment 222, and a content fragment 223.

The access group 230 provides access information for access to the service or content and includes an access fragment 231 and a session description fragment 232.

In addition to the four groups described above (200, 210, 220, and 230), the service guide includes a preview data fragment 241 and an interactivity data fragment 251. Each of the configuration units described above is referred to as a fragment, which is the minimum unit of the service guide. That is, one service guide includes fragments, which can be bundled into groups according to their purposes. In FIG. 2, solid lines interconnecting the fragments refer to inter-reference between the fragments.

The service guide delivery descriptor fragment 201 includes delivery session information including a location of a Service Guide Delivery Unit (SGDU) including fragments of the service guide, and information on an entry point for receiving a notification message and grouping information for the SGDU.

The purchase item fragment 211 provides a bundle including service, contents, time, etc., thereby helping the user to subscribe or purchase a corresponding purchase item fragment 211. The purchase data fragment 212 includes detailed information relating to the purchase and subscription, such as price information on a service or service bundle and promotion information. The purchase channel fragment 213 provides access information for subscription or purchase.

The service fragment 221 includes information of service contents, genre, service area, etc., as higher collections of the contents included in the broadcast service around the general service guide. The schedule fragment 222 indicates time information of each of the contents included in the services such as streaming and downloading. The content fragment 223 includes a detailed description of the broadcasted content, a target user group, a service area, and genre.

The access fragment 231 provides access-related information that enables a user to see the service, and provides a delivery method for a corresponding access session, session information, etc. The session description fragment 232 may be included in the access fragment 231 and notifies location information in the form of a URI so that the terminal can identify information of a corresponding session description fragment 232. The session description fragment 232 provides codec information and address information on multimedia contents existing in a corresponding session.

Further, it is possible to provide preview information on the service, schedule, and contents through the preview fragment 241, or to provide an interactive service during broadcast according to the corresponding service, schedule, and contents through the interactive fragment 251.

More detailed information on the service guide may be defined through various element values and attribute values for providing detailed contents and values based on the higher data model illustrated in FIG. 2.

In the BCAST system described above, terminals receiving a service can use the latest software and can more stably and efficiently operate only after updating firmware periodically provided by a manufacturer of the terminals. Therefore, in the BCAST system, OMA Device Management (OMA DM) standards have been defined for use of terminal firmware update standards, which is referred to as "terminal provisioning" Herein.

The exponential increase in the number of mobile terminals has caused a necessity for a standardized method for management of mobile devices, and has thus resulted in requirement for a mobile terminal management method that enables a mobile network provider or service provider to manage firmware or software of terminals while performing wireless communication with the terminals. The OMA DM can manage firmware or software within a mobile terminal by reading, adding, changing, or executing an object of the mobile terminal by using its own a DM protocol standardized by itself.

In general, the OMA DM is designed for use within a terminal of a mobile communication system, and thus enables all communications to be interactive. However, the number of terminal models will be far less compared to the actual number of subscribed terminals. Therefore, a mobile communication system of the OMA DM requires a very large quantity of resources if the firmware update of each terminal is interactively performed one-to-one. Consequently, the OMA DM uses a large quantity of resources to perform updates. Further, in a communication environment having limited radio resources, it is often impossible to perform one-to-one firmware update for the multiple terminals therein.

SUMMARY OF THE INVENTION

Therefore, the present invention has been made to solve the above-mentioned problems occurring in the prior art, and provide the advantages and improvements as will be described below. Accordingly, the present invention provides a method, an apparatus, and a system for updating firmware of terminals in a mobile broadcast system.

Also, the present invention provides a method, an apparatus, and a system capable of simultaneously updating firmware of multiple terminals by using a service guide in a broadcast system.

In accordance with an aspect of the present invention, a method is provided for updating firmware of terminals in a mobile broadcast system including a BSDA and a BSM. The method includes requesting creation of a content fragment, by the BSM, by transmitting a firmware package file for firmware update of terminals to the BSDA; creating a content fragment including the firmware package file; broadcasting the created content fragment to multiple terminals, by the BSDA; detecting the firmware package file from the received content fragment; and performing a firmware update using the firmware package file.

In accordance with another aspect of the present invention, a firmware update system of a mobile broadcast system for updating firmware of terminals is provided. The firmware update system includes a BSM for transmitting a firmware package file for firmware update of terminals to a BSDA in order to request creation of a content fragment; the BSDA fragment for creating a content fragment including the firmware package file and broadcasting the created content fragment to multiple terminals; and at least one terminal for detecting the firmware package file from the received content fragment and performing a firmware update using the firmware package file.

In accordance with another aspect of the present invention, a method is provided for updating firmware by a terminal in a mobile broadcast system, which includes a BSDA and a BSM. The method includes receiving a broadcasted content fragment; detecting a firmware package file from the received content fragment; and performing a firmware update using the firmware package file.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
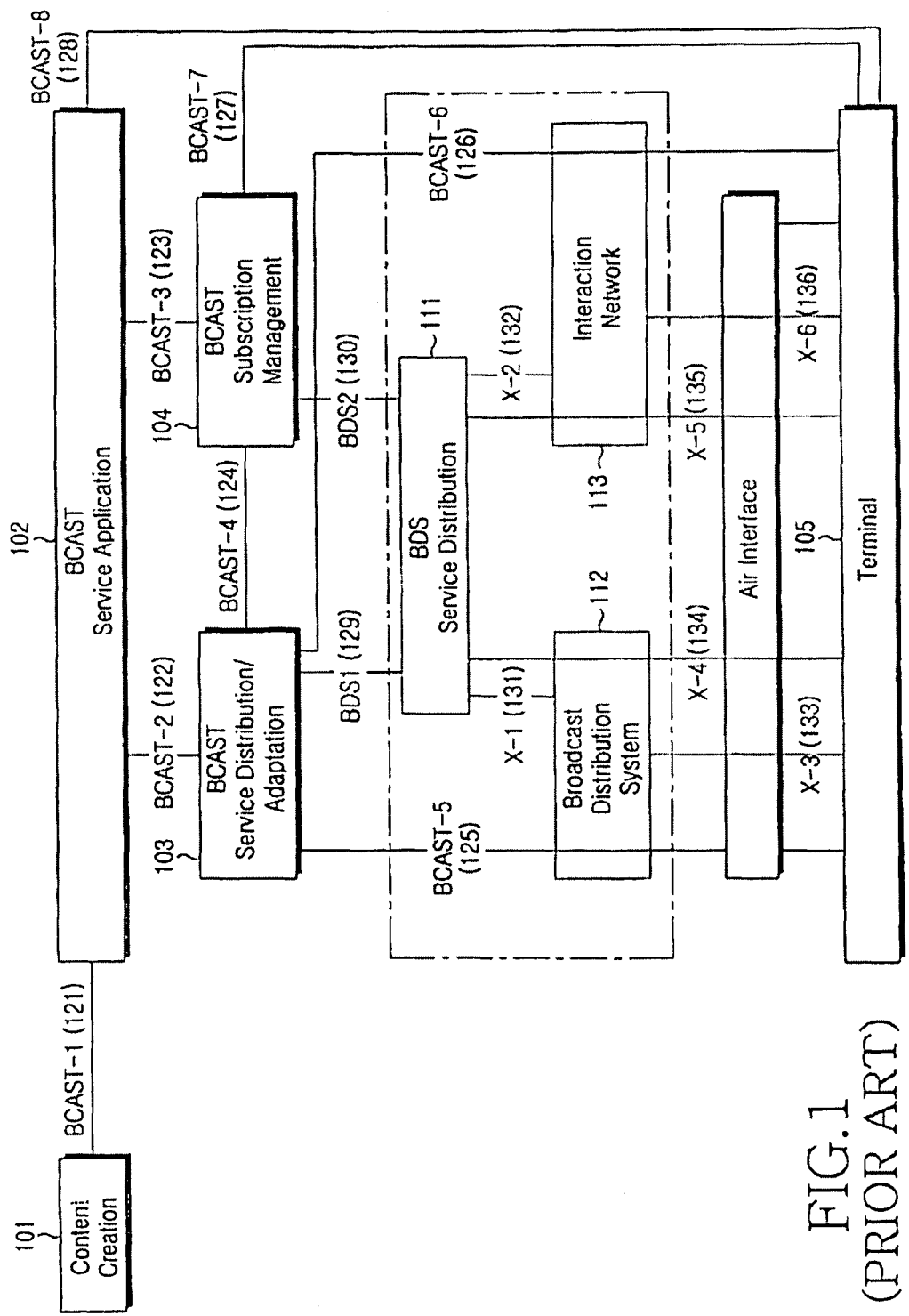
FIG. 1 is a block diagram illustrating a logical structure of a broadcast system.
Figure 2:
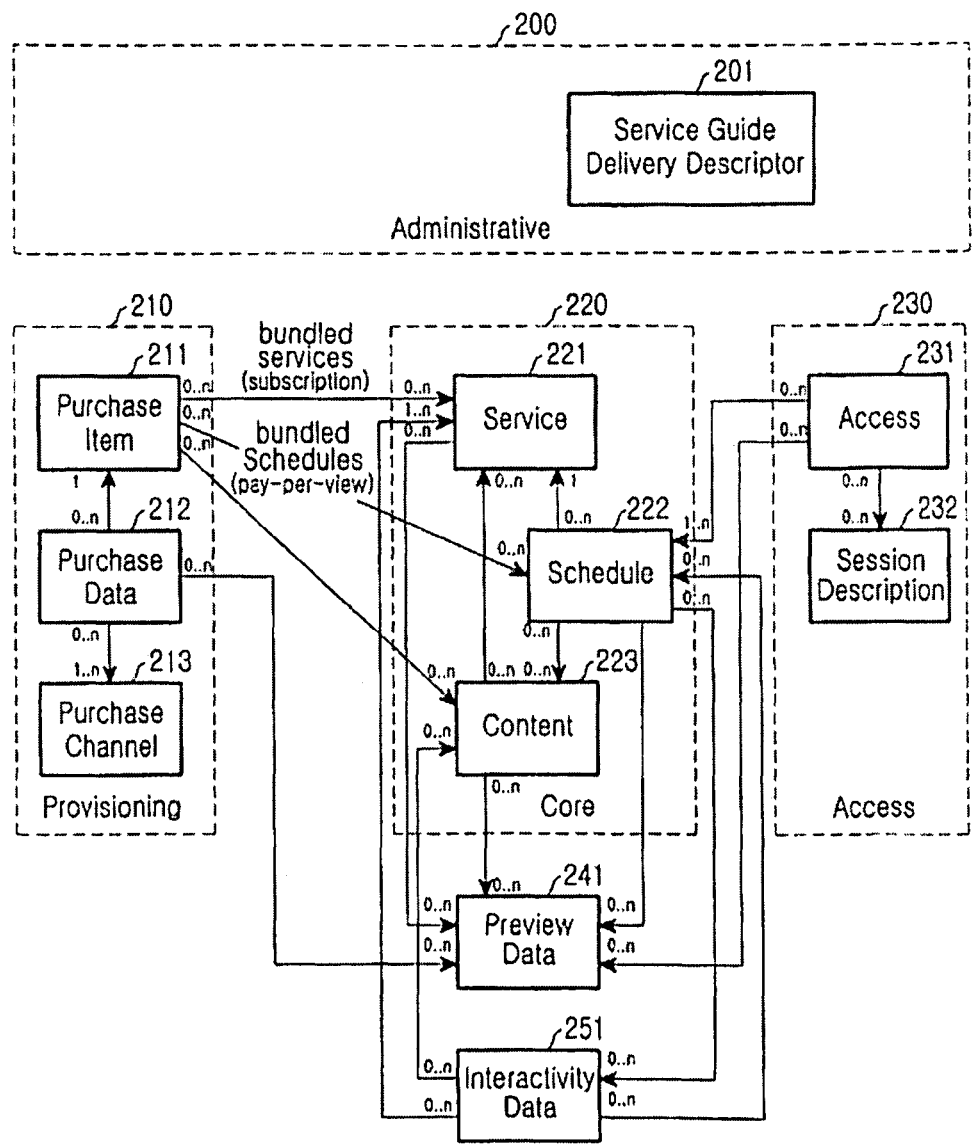
FIG. 2 illustrates a configuration of a service guide.

Hereinafter, embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The following detailed description of the embodiments of the present invention is based on a BCAST system, which is one of mobile broadcast technology standards. However, a BCAST system is only one example for helping the understanding of the present invention and should not limit the applicable scope of the present invention to the only BCAST system. Further, it should be noted that a broadcast system used herein includes various communication systems providing a broadcast service, such as a BCAST system and a DVB-H system.

Further, for convenience of description, the following description of the present invention will use the same names of the entities defined in the 3rd Generation Project Partnership (3GPP), which is an asynchronous mobile communication standard organization, or BCAST of the Open Mobile Alliance (OMA), which is an organization for standards of applications of mobile terminals. However, such standards and names should not limit the scope of the present invention.

Further, in a BCAST system providing a mobile broadcast service, a receiver relating to a downlink link service is called a "terminal."

Further, the OMA BCAST is standardizing technologies for providing an IP-based broadcast service in a mobile terminal environment, such as service guide, download and streaming transport technology, service and content protection technology, service subscription, and roaming. With the market trend of synthetic service provisions due to the convergence between wired and wireless environments as described above, the mobile broadcast technologies, such as the OMA BCAST, are expected to evolve to a level capable of providing the service in a wired/wireless united environment beyond the mobile environment.

Table 1 demonstrates a message schema table used in an embodiment of the present invention.

TABLE 1

| Name | Type | Category | Cardinality | Description | Data type |
| --- | --- | --- | --- | --- | --- |
|  |  |  |  |  |  |

In Table 1, "Name" refers to names of element values and attribute values of a message. "Type" refers to which of the element value and the attribute value a name corresponds to. The element values include values, such as E1, E2, E3, and E4, wherein E1 refers to a super-element value of an entire message, E2 refers to a sub-element value of E1, E3 refers to a sub-element value of E2, and E4 refers to a sub-element value of E3. The attribute value is expressed by A, which indicates an attribute value of a concerned element. For example, A under E1 indicates an attribute value of E1.

"Category" indicates if an element value or attribute value is required or optional. The "Category" has an M value when an element value or attribute value is required, and has O value when the element value or attribute value is optional.

"Cardinality" indicates the relation between elements and has a value of 0, 0..1, 1, 0..n, or 1..n, wherein 0 refers to an optional relation, 1 refers to an indispensable relation, and n refers to the possibility of having multiple values. For example, "0..n" implies that there may be either no, i.e., 0, element values or n values. "Description" indicates the meaning of an element or attribute value, and "Data Type" indicates the data type of an element or attribute value.

Figure 3:
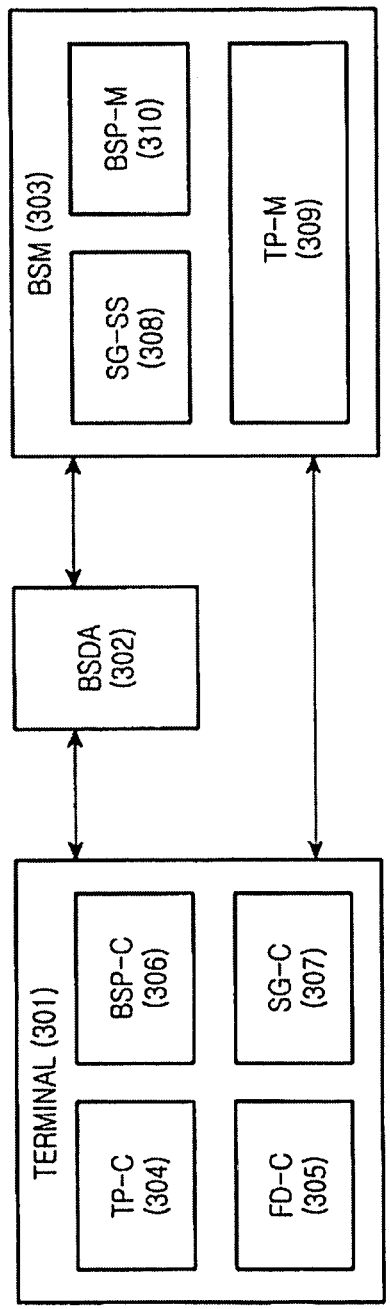
FIG. 3 is a block diagram illustrating an apparatus of a broadcast system according to an embodiment of the present invention.

FIG. 3 is a block diagram illustrating an apparatus for providing a firmware update for a broadcast service to a terminal in a broadcast system according to an embodiment of the present invention. More specifically, the apparatus illustrated in FIG. 3 includes logical entities in accordance with the present invention, further to the existing BCAST structure as illustrated in FIG. 1.

Referring to FIG. 3, the broadcast system includes a terminal 301, a BSDA 302, and a BSM 303. The terminal 301, the BSDA 302, and the BSM 303 of FIG. 3 are similar to the terminal 105, the BSDA 103, and the BSM 104, respectively, as illustrated in FIG. 1.

The terminal 301 includes a Terminal Provisioning-Client (TP-C) 304, a File Delivery-Client (FD-C) 305, a BCAST Service Provisioning-Client (BSP-C) 306, and a Service Guide-Client (SG-C) 307. The TP-C 304 receives a terminal provisioning message and performs an operation according to the terminal provisioning message. Further, the TP-C 304 performs functions of the terminal side according to the standards of the OMA DM, and manages firmware of a terminal. The FD-C 305 receives a firmware file delivered through a broadcast, and the BSP-C 306 subscribes to a service provided by the BCAST and performs a report function relating to use of the service. The SG-C 307 processes the service guide information received by the terminal 301 so that a user or the terminal 301 can use the processed information.

The BSM 303 includes a Service Guide-Subscription Source (SG-SS) 308, a Terminal Provisioning-Management (TP-M) 309, and a BCAST Service Provisioning-Management (BSP-M) 310. The SG-SS 308 provides information including service provisioning and terminal provisioning necessary for the service guide, service purchase, and service subscription. The TP-M 309 manages a terminal provisioning, generates a terminal provisioning message, and transmits the terminal provisioning message to the terminal 301. Further, as described above, the TP-M 309 performs functions of the server side in the OMA DM, and manages firmware of a terminal in the present invention. The BSP-M 310 performs functions of subscription management and purchase/charge management for the BCAST service.

Figure 4:
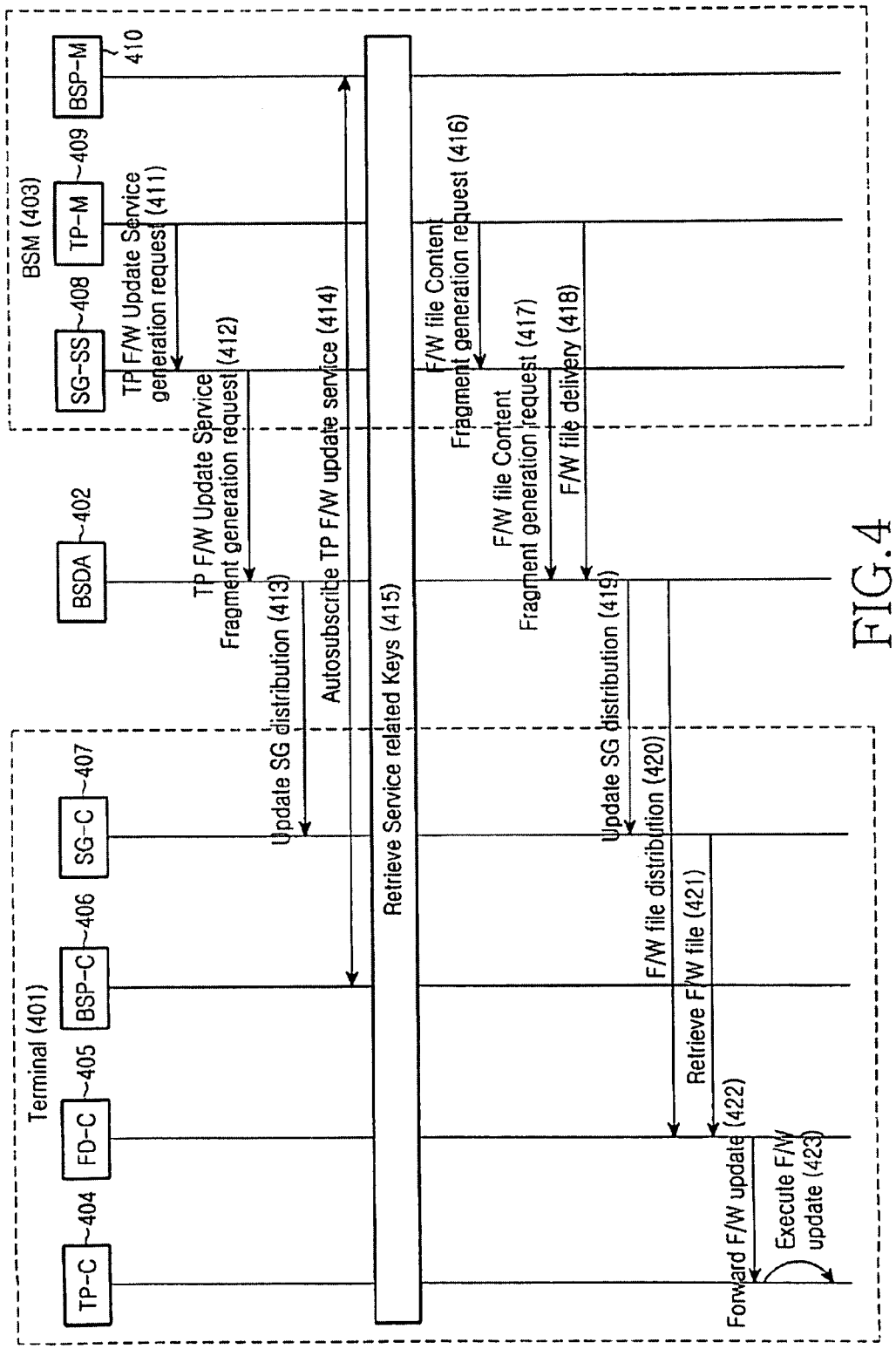
FIG. 4 is a message flow diagram of a broadcast system according to an embodiment of the present invention.

FIG. 4 is a message flow diagram according to an embodiment of the present invention.

Referring to FIG. 4, in step 411, the TP-M 409 requests the SG-SS 408 to create an update service, for operation of the terminal provisioning service.

Upon receiving the request for creation of the update service, the SG-SS 408 requests the BSDA 402 to create a service fragment for the terminal provisioning update service in step 412. Table 2 below shows an example of the message sent from the SG-SS 408 to the BSDA 402 in step 412. The message of Table 2 corresponds to a delivery message defined in the BCAST.

In accordance with an embodiment of the present invention, in the delivery message in Table 2, a new parameter named "terminal provisioning service fragment" is added to the "type" element. The type element of the delivery message notifies the usage of a delivery message and notifies the BSDA 402 of establishment of the terminal provisioning service. A service fragment to actually be provided or information necessary for generation of the service fragment is inserted in the body element.

TABLE 2

| Name | Type | Category | Cardinality | Description | Data Type |
|---|---|---|---|---|---|
| SGDelivery | E | | | Specifies the delivery message of Service Guide data over interface SG-4which is used for generating Service Guide in SG-G. Contains the following elements: BSMSelector BSMSelectorID SGData PrivateExt | |
| BSMSelector | E1 | M | 0...N | This element provides the details on the visibility of the enclosed 'SGData'. All the 'BSMSelectorID' values used in the request SHALL have one and only one of these 'BSMSelector' elements instantiated with matching identifier. Element 'BSMSelector' is specified in section 5.4.1.5.2. | complexType |
| BSMSelectorID | E1 | M | 0...N | This element represents constraints on the visibility of the all enclosed 'SGData' elements. This identifier corresponds to the 'id' attribute of the 'BSMSelector' element. See the corresponding description in the 'SGDD' for more details. | anyURI |
| SGData | E1 | M | 1...N | Contains source information to be included into the Service Guide. It is RECOMMENDED that the information is delivered in the form of BCAST Service Guide fragments. Contains the following attributes: id transportID version validFrom validTo encoding | |

TABLE 2-continued

| Name | Type | Category | Cardinality | Description | Data Type |
|---|---|---|---|---|---|
| | | | | type<br>Contains the following element:<br>Body | |
| id | A | M | 0...1 | Identifier of the data enclosed in element 'Body'. See also the description of the 'id' attribute in the 'SGDeliveryRes' message. | anyURI |
| transportID | A | O | 0...1 | Transport identifier of the data enclosed in element 'Body'. | unsignedLong |
| version | A | M | 1 | Version of the data enclosed in element 'Body'. | unsignedInt |
| validFrom | A | M | 1 | Start time of the validity of the data enclosed in element 'Body'. | unsignedInt |
| validTo | A | M | 1 | End time of the validity of the data enclosed in element 'Body'. | unsignedInt |
| encoding | A | M | 1 | Fragment encoding type of the data enclosed in element 'Body'.<br>0 - XML encoded OMA BCAST Service Guide fragment<br>1 - SDP<br>2 - MBMS User Service Bundle Description (MBMS-USBD) as specified in [3GPP TS 26.346] section 5.2.2. It may contain one or more SDP descriptions.<br>3 - AssociatedDeliveryProcedure for File and Stream Distribution as specified in [BCAST10-Distribution] section 5.3.4<br>4-127 Reserved for future use<br>128-255 Reserved for proprietary use | unsignedByte |
| type | A | M | 0...1 | Fragment encoding type of the data enclosed in element 'Body'. This SHALL be present and set to one of the values listed below f the 'Body' contains a Service Guide XML fragment and the value of 'encoding' is set to '0'.<br>5 - PurchaseItem Fragment<br>6 - PurchaseData Fragment<br>7 - PurchaseChannel Fragment<br>8 - Terminal Provisioning Service Fragment | unsignedByte |
| Body | E2 | M | 1 | Contains the delivered Service Guide data. The value SHALL be an instance of 'PurchaseItem', 'PurchaseData'. 'PurchaseChannel' or 'Service' element as specified in 5.1.2.6, 5.1.2.7 and 5.1.2.8 of [BCAST10-SG]. | complexType |
| PrivateExt | E1 | O | 0...1 | An element serving as a container for proprietary or application-specific extensions. | |
| <proprietary elements> | E2 | O | 0...N | Proprietary or application-specific elements that are not defined in this specification. These elements may further contain sub-elements or attributes. | |

Upon receiving the request for creation of a terminal provisioning service fragment, the BSDA 402 receives a fragment as shown in Table 3 through a delivery message or creates a fragment as show in Table 3 below by using information provided through the delivery message. The type of the service is "terminal provisioning."

In accordance with an embodiment of the present invention, an element named "AutoSubscribe" is added to the service fragment. The AutoSubscribe element is an element forcing the terminal 401 to subscribe to the update service, so that the terminal can automatically subscribe to a terminal provisioning service proposed by as embodiment of the present invention and receive a provided service.

TABLE 3

| Name | Type | Category | Cardinality | Description | Data type |
|---|---|---|---|---|---|
| Service | E | | | 'Service' fragment contains the following attributes:<br>id | |

TABLE 3-continued

| Name | Type | Category | Cardinality | Description | Data type |
|---|---|---|---|---|---|
| | | | | version<br>validFrom<br>vaildTo<br>globalServiceID<br>baseCID<br>emergency<br>Contains the following elements:<br>ProtectionKeyID<br>ServiceType<br>Name<br>Description<br>AudioLanguage<br>TextLanguage<br>ParentalRating<br>TargetUserProfile<br>Genre<br>Extension<br>PreviewDataReference<br>BroadcastArea<br>TermsOfUse<br>PrivateExt | |
| id | A | NM/TM | 1 | ID of the 'Service' fragment. The value of this attribute SHALL be globally unique." | anyURI |
| version | A | NM/TM | 1 | Version of this fragment. The newer version overrides the older one starting from the time specified by the 'validFrom' attribute, or as soon as it has been received if no 'vaildFrom' attribute is given. This field contains the 32 bits integer part of an NTP time stamp. | unsignedInt |
| validFrom | A | NM/TM | 0 ... 1 | The first moment when this fragment is valid. If not given, the validity is assumed to have started at some time in the past. This field contains the 32 bits integer part of an NTP time stamp. | unsignedInt |
| validTo | A | NM/TM | 0 ... 1 | The last moment when this fragment is valid. If not given, the validity is assumed to end in undefined time in the future. | unsignedInt |
| globalServiceID | A | NM/TM | 0 ... 1 | The globally unique identifier identifying the service this 'Service' fragment describes.<br>Omitted | anyURI |
| PreviewDataIDRef | E2 | NO/TM | 0 ... N | Reference to the 'PreviewData' fragment, which carries the representation of Terms of Use.<br>If this element is not present, the 'TermsOfUseText' SHALL be present. | anyURI |
| TermsOfUseText | E2 | NO/TO | 0 ... 1 | Terms of Use text to be rendered.<br>If 'PeviewDataIDRef' element is present under the 'TermsOfUse', this element SHALL NOT be present. | String |
| AutoSubscribe | E1 | NO/TM | 0 ... 1 | Signals to be terminals whether to automatically subscribe to this service. | boolean |
| PrivateExt | E1 | NO/TO | 0 ... 1 | An element serving as a container for proprietary or application-specific extensions. | |
| <proprietary element> | E2 | NO/TO | 0 ... N | Proprietary or application-specific elements that are not defined in this specification. These elements may further contain sub-elements or attributes. | |

In step 413, the BSDA 402 broadcasts the created service guide fragment to terminals.

Upon receiving the upgraded service guide through the broadcasted created service guide fragment, the SG-C 407 determines if there is a changed portion in the service guide. Then, the terminal 401 discovers a newly added terminal provisioning service in the changed service guide through the SG-C 407, and then requests subscription to the update service to the BSP-M 410 through the BSP-C 406 according to the indication of the AutoSubscribe element included in the update service fragment in step 414. According to the implementation or business model, the AutoSubscribe element may be omitted. Then, in step 415, a security process for using the BCAST service is performed.

When the TP-M 409 wants to update firmware of terminals of a particular model, the TP-M 409 requests the SG-SS 408 to create content fragment for firmware files for firmware update in step 416. The firmware package file delivered in step 416 is, for example, a compressed file in the form of gzip, which includes a file for firmware update and a file storing OMA DM firmware update commands indicating execution of update. The firmware package file may be another type of compressed file other than the gzip type compressed file.

Upon receiving the request for creation of the content fragment for the firmware package file, the SG-SS 408 adds a new type element value named "Content Fragment" to the delivery message used in step 412 (step 417). An example of the delivered message is shown below in Table 4.

TABLE 4

| Name | Type | Category | Cardinality | Description | Data Type |
|---|---|---|---|---|---|
| SGDelivery | E | | | Specifies the delivery message of Service Guide data over interface SG-4which is used for generating Service Guide in SG-G. Contains the following elements: BSMSelector BSMSelectorID SGData PrivateExt | |
| BSMSelector | E1 | M | 0...N | This element provides the details on the visibility of the enclosed 'SGData'. All the 'BSMSelectorID' values used in the request SHALL have one and only one of these 'BSMSelector' elements instantiated with matching identifier. Element 'BSMSelector' is specified in section 5.4.1.5.2. | complexType |
| BSMSelectorID | E1 | M | 0...N | This element represents constraints on the visibility of the all enclosed 'SGData' elements. This Identifier corresponds to the 'id' attribute of the 'BSMSelector' element. See the corresponding description in the 'SGDD' for more details. | anyURI |
| SGData | E1 | M | 1...N | Contains source information to be included into the Service Guide. It is RECOMMENDED that the information is delivered in the form of BCAST Service Guide fragments. Contains the following attributes: id transportID version validFrom validTo encoding type Contains the following element: Body | |
| id | A | M | 0...1 | Identifier of the data enclosed in element 'Body'. See also the description of the 'id' attribute in the 'SGDeliveryRes' message. | anyURI |
| transportID | A | O | 0...1 | Transport identifier of the data enclosed in element 'Body'. | unsignedLong |
| version | A | M | 1 | Version of the data enclosed in element 'Body'. | unsignedInt |
| validFrom | A | M | 1 | Start time of the validity of the data enclosed in element 'Body'. | unsignedInt |
| validTo | A | M | 1 | End time of the validity of the data enclosed in element 'Body'. | unsignedInt |
| encoding | A | M | 1 | Fragment encoding type of the data enclosed in element 'Body'. 0 - XML encoded OMA BCAST Service Guide fragment 1 - SDP 2 - MBMS User Service Bundle Description (MBMS-USBD) as specified in [3GPP TS 26.346] section 5.2.2. It may contain one or more SDP descriptions. 3 - AssociatedDeliveryProcedure for File and Stream Distribution as specified in [BCAST10-Distribution] section 5.3.4 4-127 Reserved for future use 128-255 Reserved for proprietary use | unsignedByte |
| type | A | M | 0...1 | Fragment encoding type of the data enclosed in element 'Body'. This SHALL be present and set to one of the values listed below f the 'Body' contains a Service Guide XML fragment and the value of 'encoding' is set to '0'. 5 - PurchaseItem Fragment 6 - PurchaseData Fragment 7 - PurchaseChannel Fragment 8 - Terminal Provisioning Service Fragement 9 - Content Fragment | unsignedByte |
| Body | E2 | M | 1 | Contains the delivered Service Guide data. The value SHALL be an instance of 'PurchaseItem', 'PurchaseData', 'PurchaseChannel', 'Service' or | complexType |

TABLE 4-continued

| Name | Type | Category | Cardinality | Description | Data Type |
|---|---|---|---|---|---|
| PrivateExt | E1 | O | 0 . . . 1 | 'Content' element as specified in 5.1.2.6. 5.1.2.7 and 5.1.2.8 of [BCAST10-SG]. An element serving as a container for proprietary or application-specific extensions. | |
| <proprietary elements> | E2 | O | 0 . . . N | Proprietary or application-specific elements that are not defined in this specification. These elements may further contain sub-elements or attributes. | |

The BSDA 402 either receives the content fragment created as shown in Table 5 below through the delivery message or creates the fragment based on the information provided through the delivery message in step 417.

Here, in a content fragment according to an embodiment of the present invention, an element named "TerminalProvisioning" and its sub-elements named "manufacturer", "model", "fwVersion", and "command" are added to the existing content fragment. The manufacture (vendor) element has a value for identifying a terminal manufacturer to be subjected to the firmware update, and the model element has a value for identifying the terminal model. The fwVersion element indicates a firmware version provided for the firmware upgrade. The elements of manufacturer, model, and fwVersion are filtering elements used for firmware filtering of the terminal.

TABLE 5

| Name | Type | Category | Cardinality | Description | Data type |
|---|---|---|---|---|---|
| Content | E | | | 'Content' fragment contains the following attributes: id version validFrom vaildTo globalContentID emergency serviceContentProtection baseCID Contains the following elements: ServiceReference ProtectionKeyID ServiceType Name Description StartTime EndTime AudioLanguage TextLanguage Length ParentalRating TargetUserProfile Genre Extension PreviewDataReference BroadcastArea TermsOfUse PrivateExt | |
| id | A | NM/TM | 1 | ID of the 'Content' fragment. The value of this attribute SHALL be globally unique. | anyURI |
| version | A | NM/TM | 1 | Version of this fragment. The newer version overrides the older one starting from the time specified by the 'validFrom' attribute, or as soon as it has been received if no 'vaildFrom' attribute is given. | unsignedInt |
| validFrom | A | NM/TM | 0 . . . 1 | The first moment when this fragment is valid. If not given, the validity is assumed to have started at some time in the past. This field contains the 32 bits integer part of an NTP time stamp. | unsignedInt |
| validTo | A | NM/TM | 0 . . . 1 | The last moment when this fragment is valid. If not given, the validity is assumed to end in undefined time in the future. This field contains the 32 bits integer part of an NTP time stamp. | unsignedInt |
| globalContentID | A | NM/TM | 0 . . . 1 | The globally unique identifier identifying the service that this 'Service' fragment describes. Omitted | anyURI |
| TermsOfUseText | E2 | NO/TM | 0 . . . 1 | Terms of Use text to be rendered. If 'PeviewDataIDRef' element is present under the 'TermsOfUse', this element SHALL NOT be present. | String |

TABLE 5-continued

| Name | Type | Category | Cardinality | Description | Data type |
|---|---|---|---|---|---|
| TerminalProvisioning | E1 | NO/TM | 0 . . . 1 | Terminal Provisioning specific information consists of the following elements:<br>Manufacturer<br>Model<br>FwVersion<br>Command | |
| Manufacturer | E2 | NO/TM | 0 . . . 1 | Terminal manufacturer ID. The terminal manufacturer ID must be recognizable by the terminal. | String |
| Model | E2 | NO/TM | 0 . . . 1 | Terminal model ID. The terminal model ID must be recognizable by the terminal | String |
| FwVersion | E2 | NO/TM | 0 . . . 1 | Firmware version number. The terminal must recognize the firmware version | String |
| PrivateExt | E1 | NO/TO | 0 . . . 1 | An element serving as a container for proprietary or application-specific extensions. | |
| <proprietary elements. | E2 | NO/TO | 0 . . . N | Proprietary or application-specific elements that are not defined in this specification. These elements may further contain sub-elements or attributes. | |

In step 418, the TP-M 409 delivers the firmware package file to the BSDA 402. The current BCAST standards do not include a definition on a method of delivering a file between the TP-M 409 and the BSDA 402. However, because there is a definition for a method of delivering a file between the BSDA 402 and the BSM 102 and the same type of delivery is necessary in the process of the present invention, an embodiment of the present invention follows the file delivery method between the BSDA 402 and the BSM 102 defined in the BCAST standards.

In step 419, the BSDA 402 broadcasts the content fragment created in step 417 to multiple terminals.

When the terminals having subscribed to the terminal provisioning service in step 414 recognize the content update in the terminal provisioning service of the service guide updated through the SG-C 407 having received the broadcasted content fragment, they check the terminal provisioning elements of a concerned content fragment.

As illustrated in FIG. 4, the terminal 401 checks the manufacturer, model, and FwVersion among the terminal provisioning elements added in Table 5 of the present invention. As a result of the checking, when the manufacturer and the model are identical to the manufacturer and model of the terminal 401 and the updated firmware version is newer than the current firmware version installed in the terminal, the terminal 401 receives the firmware package file broadcasted through the FD-C 405 in step 420. In step 421, the terminal 401 acquires the firmware package file through the FD-C 405 and decompresses the firmware package file. Further, the terminal 401 delivers an actual firmware file in the firmware package file and a firmware update command of the OMA DM in the firmware update command file to the TP-C 404 in step 422. In step 423, the TP-C 404 performs firmware update by the actual firmware file according to the received firmware update command file, and (although not shown) may send an installation success message to the TP-M 409.

Although the above description is directed to firmware updates, the embodiments of the present invention are also applicable to updating typical software, other than firmware, according to the implementation or service scenario in providing a terminal provisioning service.

As described above, a firmware update is provided through a broadcast service. Therefore, it is possible to reduce the overhead of individual upgrade of the firmware of each terminal in the prior art. That is, it is possible to simultaneously update the firmware of multiple terminals through a broadcast service. Therefore, the embodiments of the present invention can achieve a more efficient use of limited radio resources, thereby improving the efficiency of firmware update.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of updating firmware of terminals in a mobile broadcast system including a Broadcast Service Distribution/Adaptation fragment (BSDA) and a Broadcast service Subscription Management (BSM), the method comprising:
   transmitting a request for creation of a content fragment, by the BSM, to the BSDA;
   delivering, by the BSM, a firmware package to the BSDA;
   broadcasting, by the BSDA, a service guide including the content fragment to at least one terminal; and
   distributing, by the BSDA, the firmware package to the at least one terminal,
   wherein the content fragment includes a terminal provisioning element to provide information that enables targeted terminals to retrieve the firmware package, and
   wherein the content fragment includes sub-elements of the terminal provisioning element that are subject to a firmware update, the sub-elements of the terminal provisioning element including a manufacturer identifier element of a terminal, a model identifier element of the terminal, and a firmware version element provided for the firmware update.

2. The method of claim 1, wherein the firmware package includes a file required for the firmware update and a firmware update command indicating execution of the firmware update.

3. The method of claim 1, wherein transmitting the request for creation of the content fragment comprises transmitting, by the BSM, a delivery message including a type element to the BSDA.

4. The method of claim 1, further comprising performing the firmware update, by the at least one terminal, by checking the terminal provisioning element included in the content fragment, and when a result of the checking indicates that the manufacturer identifier element and the model identifier element of the terminal included in the content fragment are identical to those of the at least one terminal and the firmware version included in the content fragment is newer than a current firmware version of the at least one terminal, receiving the firmware package file included in the content fragment.

5. The method of claim 1, before transmitting the request for creation of the content fragment, further comprising:
transmitting, by the BSM, a request for creation of a service fragment by transmitting information for a terminal provisioning to the BSDA;
broadcasting, by the BSDA, the service fragment to at least one terminal; and
when the at least one terminal finds a newly added terminal provisioning service in the service fragment, transmitting a request for a service subscription to the BSM.

6. The method of claim 5, wherein transmitting the request for creation of the service fragment further comprises transmitting, by the BSM, a delivery message including a terminal provisioning service type element for establishment of a terminal provisioning service and a body element including information necessary for establishment of a service fragment, to the BSDA.

7. The method of claim 5, wherein the service fragment includes an automatic subscription element indicating that the at least one terminal is to automatically subscribe to a broadcast service.

8. A firmware update system for updating firmware of at least one terminal of a mobile broadcast system, the firmware update system comprising:
a Broadcast service Subscription Management (BSM) for requesting creation of a content fragment and delivering a firmware package; and
a Broadcast Service Distribution/Adaptation (BSDA) for receiving the firmware package and broadcasting a service guide including the content fragment and the firmware package to the at least one terminal,
wherein the at least one terminal receives the content fragment and the firmware package and performs a firmware update using the firmware package,
wherein the content fragment includes a terminal provisioning element to provide information that enables targeted terminals to retrieve the firmware package, and
wherein the content fragment includes sub-elements of the terminal provisioning element subject to firmware update, the sub-elements of the terminal provisioning element including a manufacturer identifier element of a terminal, a model identifier element of the terminal, and a firmware version element provided for the firmware update.

9. The firmware update system of claim 8, wherein the BSM comprises:
a Service Guide Subscription Source (SG-SS) for providing information necessary for a service guide including service provisioning, terminal provisioning, service purchase, and service subscription;
a Terminal Provisioning Management (TP-M) for managing the terminal provisioning, creating a terminal provisioning message, transmitting the created terminal provisioning message to the at least one terminal, and for managing firmware of the at least one terminal by a server side; and
a Broadcast Service Provisioning Management (BSP-M) for managing subscription to, purchase of, and charges for a broadcast service.

10. The firmware update system of claim 8, wherein said at least one terminal comprises:
a Terminal Provisioning Client (TP-C) for receiving a terminal provisioning message, performing an operation according to the received terminal provisioning message, and managing firmware of said at least one terminal;
a File Delivery Client (FD-C) for receiving a file delivered through a broadcast; and
a Service Guide Client (SG-C) for processing the received service guide information into a type usable by said at least one terminal, and providing the processed information to said at least one terminal.

11. The firmware update system of claim 8, wherein the firmware package comprises:
a file necessary for the firmware update; and
a firmware update command indicating execution of the firmware update.

12. The firmware update system of claim 8, wherein the BSM transmits a delivery message including a type element to the BSDA.

13. The firmware update system of claim 8, wherein the at least one terminal checks the terminal provisioning element included in the content fragment, and receives the firmware package included in the content fragment, when a result of the checking indicates that the manufacturer identifier element and the model identifier element of the terminal included in the content fragment are identical to those of the at least one terminal and the firmware version included in the content fragment is newer than a current firmware version of the at least one terminal.

14. The firmware update system of claim 8, wherein, before requesting creation of the content fragment, the BSM requests creation of a service fragment by transmitting information for terminal provisioning to the BSDA, the BSDA broadcasts the service fragment to at least one terminal, and the at least one terminal requests service subscription, when finding a newly added terminal provisioning service in the broadcasted service fragment.

15. The firmware update system of claim 14, wherein the BSM transmits a delivery message including a terminal provisioning service type element for establishment of a terminal provisioning service and a body element including information necessary for establishment of a service fragment, to the BSDA.

16. The firmware update system of claim 14, wherein the service fragment comprises an automatic subscription element indicating that the at least one terminal is to automatically subscribe to a broadcast service.

* * * * *